United States Patent [19]
McCracken

[11] Patent Number: 5,402,825
[45] Date of Patent: Apr. 4, 1995

[54] BALL VALVE COUPLING

[75] Inventor: Donald G. McCracken, Horton, Mich.

[73] Assignee: Aeroquip Corporation, Maumee, Ohio

[21] Appl. No.: 257,645

[22] Filed: Jun. 9, 1994

[51] Int. Cl.[6] ............................................. F16L 37/28
[52] U.S. Cl. ........................ 137/614.06; 137/674.01
[58] Field of Search .................... 137/614.06, 614.01; 251/149.2, 149.6, 149.9

[56] References Cited

U.S. PATENT DOCUMENTS

| | | | |
|---|---|---|---|
| 3,159,180 | 12/1964 | Courtot et al. | 137/614.06 |
| 4,271,865 | 6/1981 | Galloway et al. | |
| 4,438,779 | 3/1984 | Allread | |
| 4,577,659 | 3/1986 | Gembus et al. | |
| 4,664,149 | 5/1987 | Fremy | 137/614.06 |
| 5,090,448 | 2/1992 | Tuchet | |
| 5,099,883 | 3/1992 | Maiville | 137/614.06 |

Primary Examiner—A. Michael Chambers

[57] ABSTRACT

This invention relates to a flat ball valve coupling that reduces spillage to less than 1CC. The coupling provides numerous safeguards against spillage because one of the flat ball valves rotates and pulls away from the other flat ball valve. This eliminates any spacing between the flat ball valves in the closed position thereby eliminating spillage during uncoupling. Another feature is an interlock which prevents the coupling from being accidently disconnected when either valve is open.

14 Claims, 5 Drawing Sheets

BALL VALVE COUPLING

Technical Field

This invention relates to ball valves for fluid couplings. More specifically, the invention relates to the means for opening and closing the ball valves.

BACKGROUND ART

Fluid couplings, such as the type commonly found on the end of flexible hoses often use ball valves. The flow passage of a coupling or fitting houses the ball valves. Rotating the ball 90° fully opens or closes the valves. Closing the ball valves before disconnecting the coupling provides low spillage or zero spillage of fluid, typically a hydrocarbon. When the couplings join together, each ball valve rotates to a flow permitting position. Before the couplings separate, each ball valve rotates to a flow preventing position. The ball valves interfit with one another so that a minimum volume of fluid is lost when the couplings separate.

One improvement in ball valve design has been a semi-spherical identical ball valves including flat exterior surfaces. When the ball valves are in the closed position, the flat surfaces are substantially coplanar. See U.S. Pat. No. 5,099,883. The patent shows a high flow, low spill valve coupling that reduces trapping fluid and spillage. As good as this flat coupling is, the two flat ball valves need a very small clearance or cavity between them to allow the ball valves to rotate. As small as this cavity may be, it fills with fluid that spills when the coupling disconnects. Tighter regulations are demanding less spillage. Some advances in technology have reduced spillage to 3 cc's.

DISCLOSURE OF INVENTION

We now have developed a new flat ball design that reduces spillage to less than 1 cc. The coupling eliminates the cavity and provides numerous safeguards against spillage, In this invention, the first flat ball rotates on fixed trunions. Rotating 90° fully opens or closes the valve. However, the fixed trunions hold the first flat valve in a fixed position perpendicular to the flow of fluid through the coupling. The second flat ball rotates on a cam roller. Rotating 90° fully opens or closes the valve. However, as the second flat ball rotates, it pulls away from the first flat ball. At 45° of rotation, the second flat ball reaches the maximum distance away from the first flat ball.

This design uses an outside cam arrangement and sliding trunion that allows the two flat balls to come together in the closed position. To open the valves, the second flat ball must be opened first. The second flat ball rotates away from the first flat ball. This is the feature that allows the flat surfaces to abut each other in the closed position with no cavity or space between the valves.

This invention also includes a unique handle design. This feature prevents uncoupling the coupling when the valves are open.

Our flat ball design features the following elements:
  cam roller to move flat ball;
  inline handles;
  ball seals replaceable from front;
  self supporting latch design;
  replaceable wear plates;
  handle interlock-latch; and
  double row ball bearing swivel.

BEST MODE FOR CARRYING OUT INVENTION

Figure 1:
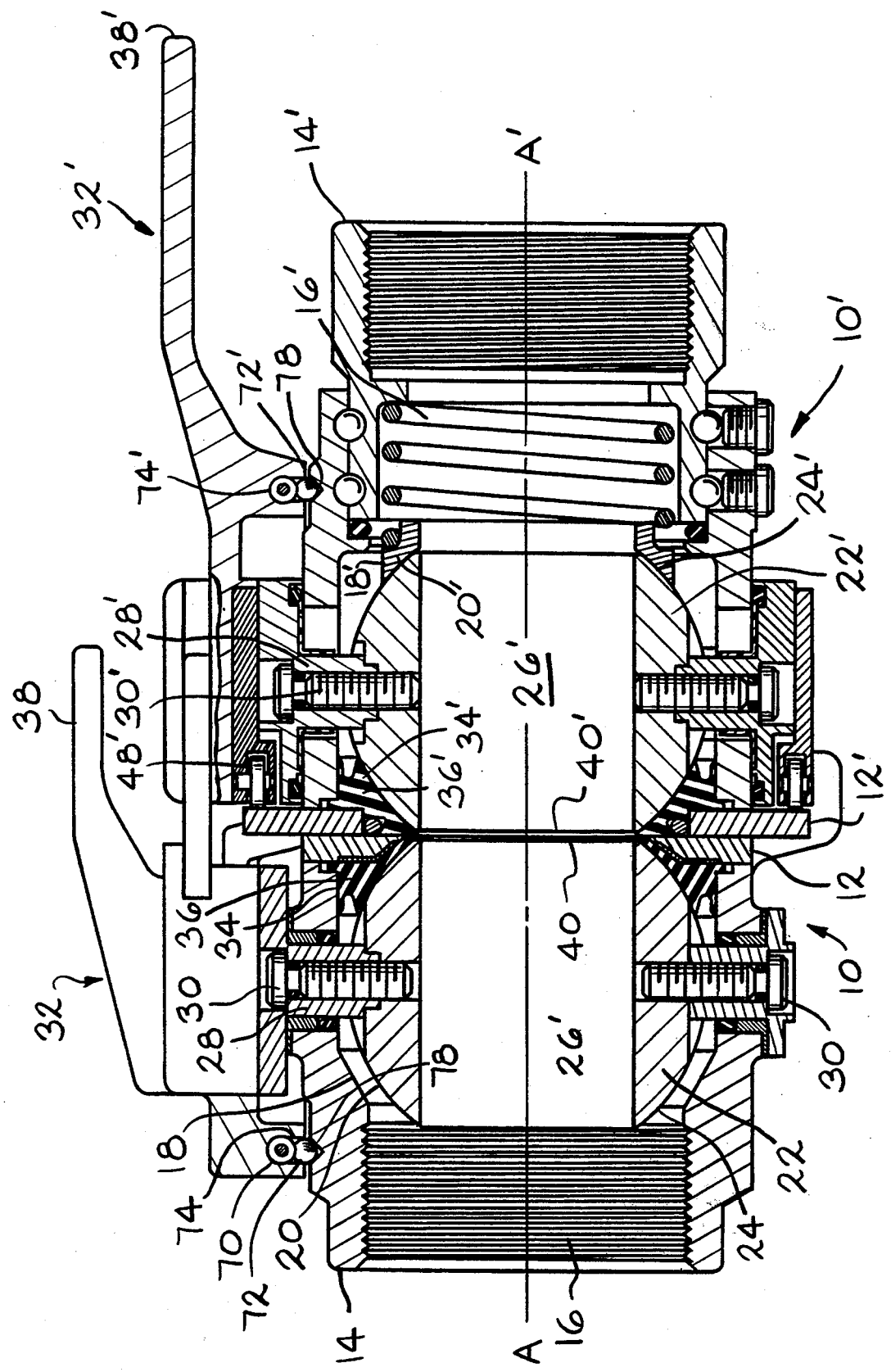
FIG. 1 shows the fluid coupling of this invention with the flat ball valves in the open position.

Our uniqueness is not in using these features separately but in the way the features co-operate with each other to prevent spillage, especially during coupling and uncoupling the ball halves. Essentially, our design approaches zero spillage, i.e. less than 0.1 cc.

FIGS. 1 to 6 show a coupling according to this invention. The coupling halves are identical in most respects. For this reason, identical reference numerals and primes are used where appropriate. The coupling includes annular body 10 having conduit connection end 12, and coupling end 14. The body 10 includes passage 16 which intersects the ends, and an annular valve seat is defined within the passage concentric thereto by surface 18, and a seal ring 20.

A ball valve 22 is rotatably mounted within the passage 16 and includes a spherical exterior surface 24 and a diametrical bore 26 which extends therethrough. As will be appreciated, the valve seat spherical surface 18 and seal 20 engages the ball valve surface.

FIG. 1 shows handles 38 and 38' in the open position and shows ball valves 22 and 22' in the open position. Ball valve 22 receives head 30 of ball valve actuator 32. Seals under heads 30 and 30' prevent leaking at the heads. The wall of body 10 defines bore 34 and seal 36 seals bore 34. Actuator 32 includes handle 38 disposed adjacent the exterior of body 10 as to be exteriorly accessable. When handle 38, ball valve 22 and bore 26 are at a position 90° to axis A-A', ball valve 22 is closed. Rotating handle 38, ball valve 22 and bore 26 counterclockwise 90° to a position parallel with axis A—A' opens ball valve 22. Bore 26 then is aligned with axis A-A' and permits unrestricted fluid flow through body 10.

Figure 2:
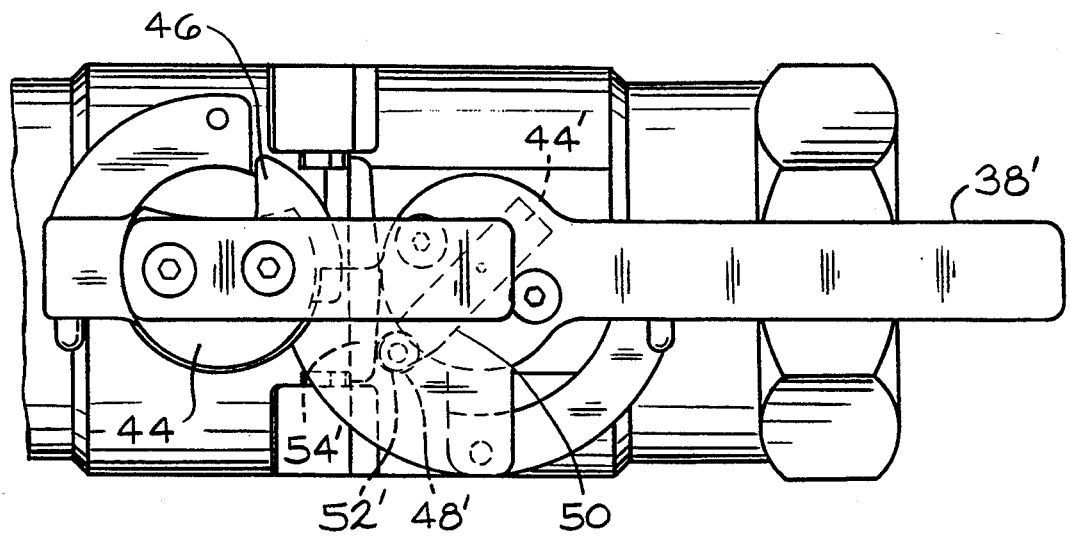
FIG. 2 is a top view showing the handles of this invention in the open position.
Figure 3:
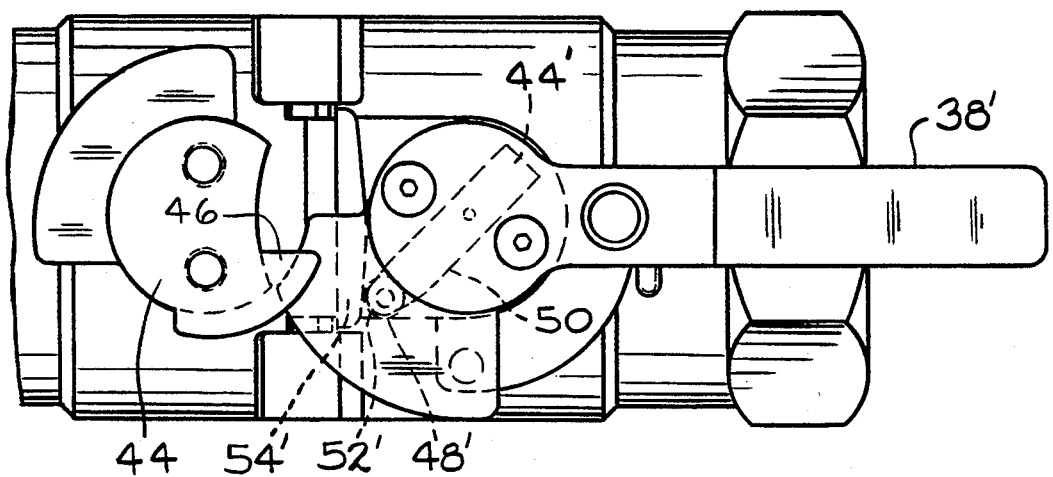
FIG. 3 is a top view showing the first handle of this invention in the closed position.
Figure 4:
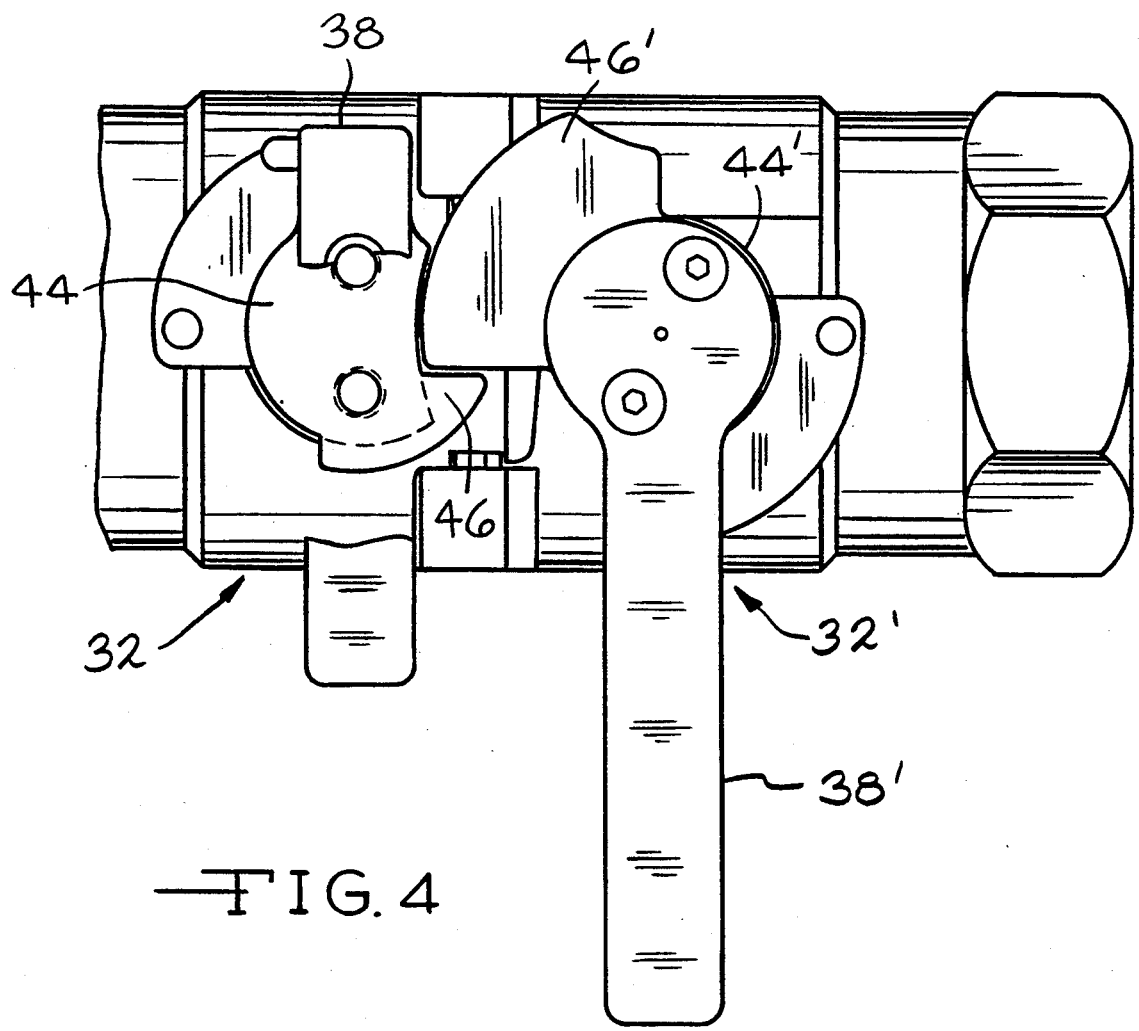
FIG. 4 is a top view with the handles of this invention in the closed position.

FIG. 2 shows handles 38 and 38' in the open position. FIG. 3 shows handle 38 in the closed position and handle 38' in the open position. FIG. 4 shows both handles 38 and 38' in the closed position. Actuator 32 includes exterior top section 44 and geometrical lip or flange 46. When ball valve 22 is open, flange 46 interferes with latches 12 and 12' and prevents the uncoupling of bodies 10 and 10'. When ball valve 22' is open, lip or flange 46' interferes with latches 12 and 12' and prevents the uncoupling of bodies 10 and 10'. When either valve is open, one cannot uncouple the two halves. Accordingly, the handle/flange geometry as well as the gaps/no gap between the ball valves dictate interference or sequential opening and closing of ball valves 22 and 22'.

Figure 5:
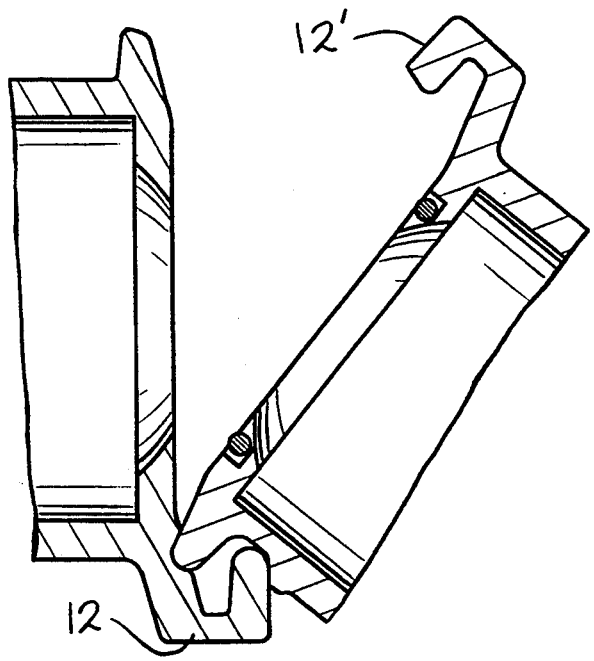
FIG. 5 is an enlarged view of the latch of this invention with the latch partially opened.
Figure 6:
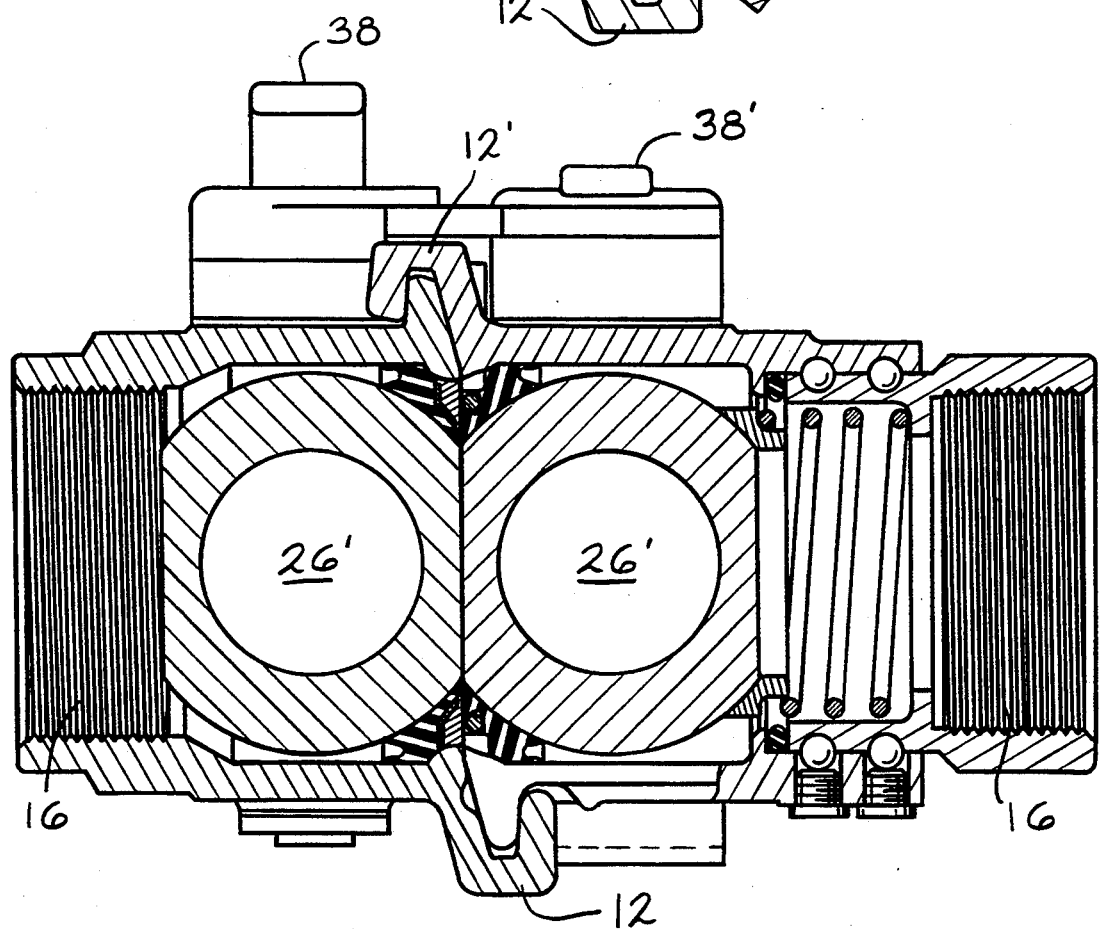
FIG. 6 shows the fluid coupling of this invention with the flat ball valves in the closed position.
Figure 7:
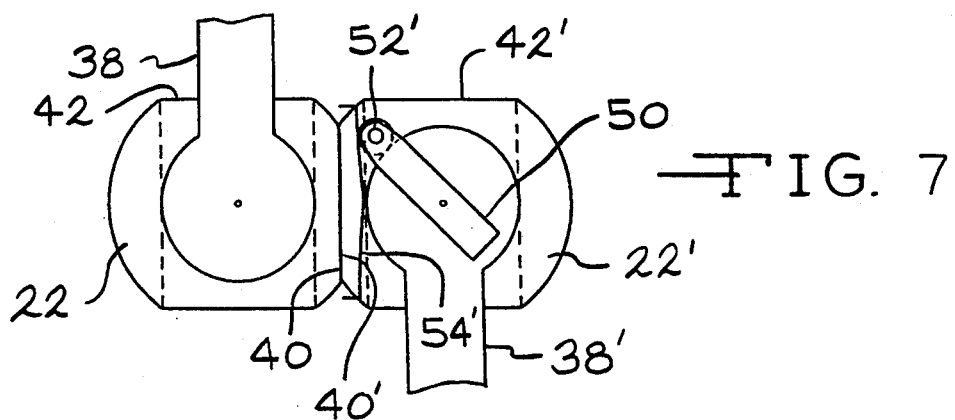
FIGS. 7, 8, 9 and 10 show the operation of the means for rotating the second ball valve of this invention.
Figure 8:
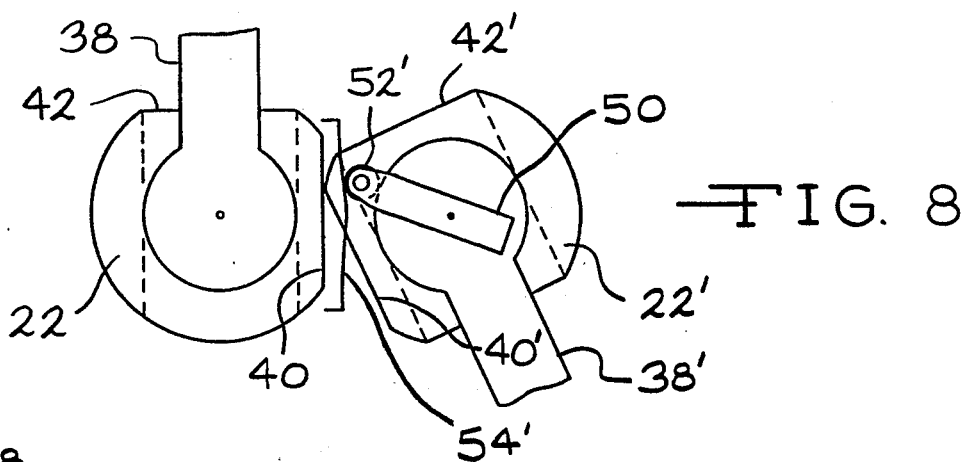
Figure 9:
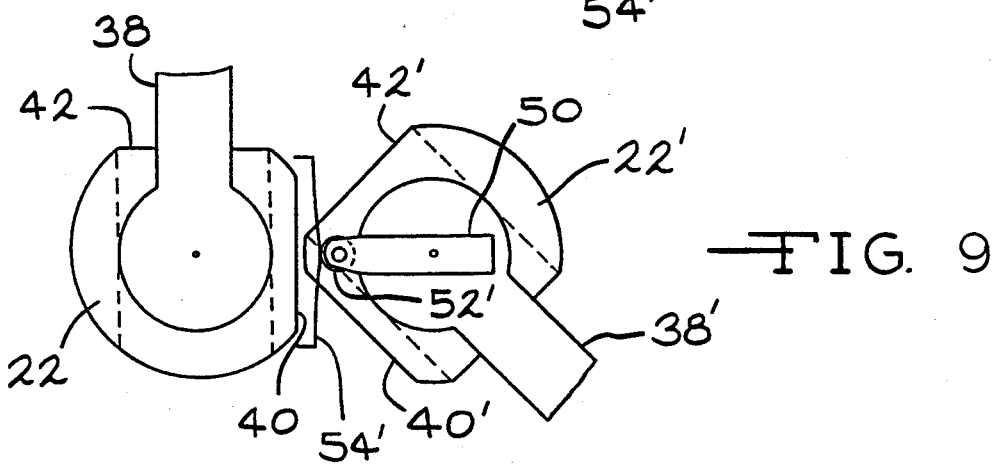
Figure 10:
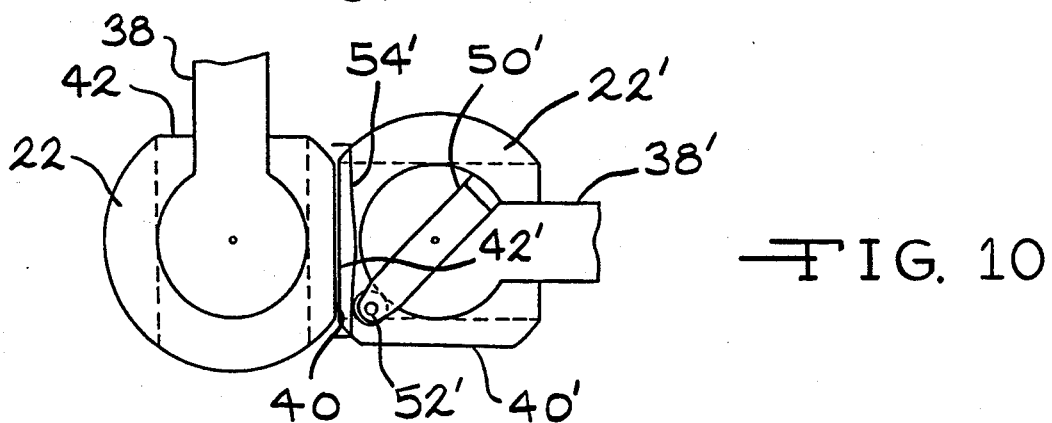

FIG. 3 shows handle 38 in the closed position and FIG. 4 shows handles 38 and 38' in the closed position. FIGS. 2, 3 and 4 also show cam roller 48'. Cam roller 48' is housed in bore 50' beneath top section 44' of handle 38'. Roller 52' pushes against shoulder 54' and moves ball valve 22' away from ball valve 22 as ball valve 22' rotates. FIG. 5 is an enlarged view showing latch 12 and 12' partially open. Note, ball valves 22 and 22' are in the closed position when this occurs. Latch 12' lifts up to uncouple the halves. Either flange or both flanges 46 and 46' in the open position interfere with lifting and prevent latches 12 and 12' from uncoupling. FIG. 6 shows ball valves 22 and 22' in the closed position. FIG. 7 to 10 show the operation of cam roller 48' and the rotation of ball valve 22'. FIG. 7 shows ball valve 22 including flat surface 40 wherein flat surfaces 40 and 40' abut each other when ball valves 22 and 22' are in the closed position. FIG. 10 shows ball valve 22 including flat surface 42 wherein flat surfaces 42 and 42' are adjacent and spaced apart when ball valves 22 and 22' are in the open position after rotating 90°. FIG. 8 shows ball valve 22' rotated 25°. Maximum travel of trunion has not been reached and ball valve 22' still is very near to ball valve 22. FIG. 9 shows ball valve 22' reaching the maximum distance way from the ball valve 22 at 45° of rotation. Typically, the maximum travel of trunion is ⅜ inch.

A further embodiment of this invention is handle button releases 70 and 70'.

Button release 70 engages the head of ball or pin 72 in bore 74. A spring, not shown, continually bias pin 72 towards the top surface of housing 10. When handle 38 is in the closed position, pin 72 engages recess 78 in body 10 and prevents handle 38 from rotating.

We claim:

1. A fluid, ball valve coupling comprising:
 a first annular body defining a passage therethrough, a first ball valve rotatably mounted within the passage, the first ball valve including a spherical exterior surface and a bore extending therethrough, means for rotating the first ball valve between an open position when the bore is in alignment with the passage and a closed position when the bore is transversely disposed to the passage;
 a second annular body defining a passage therethrough, a second ball valve rotatably mounted within the passage, the second ball valve including a spherical exterior surface and a bore extending therethrough, means for rotating the second ball valve between an open position when the bore is in alignment with the passage and a closed position when the bore is transversely disposed to the passage;
 a means for coupling the annular bodies;
 wherein the first ball valve and the second ball valve each include flat surfaces wherein a flat surface of the first ball valve abuts a flat surface of the second ball valve when the ball valves are in the closed position, and wherein a flat surface of the first ball valve is adjacent a flat surface of the second ball valve with a space therebetween then the second ball valve is in the open position; and
 wherein the means for rotating the second ball valve includes a means for pulling the second ball valve away from the first ball valve, the second ball valve rotates from the closed position to the open position.

2. A fluid coupling according to claim 1 wherein the second ball valve interferes with the first ball valve during rotating the first ball valve when the second ball valve is in the closed position.

3. A fluid coupling according to claim 1 wherein the second ball valve does not interfere with rotating the first ball valve when the second ball valve is in the open position.

4. A fluid coupling according to claim 1 wherein the second ball valve must be in the open position before the first ball valve can rotate.

5. A fluid coupling according to claim 1 wherein the means for rotating the second ball valve includes a cam roller.

6. A fluid coupling according to claim 1 wherein the means for rotating the first ball valve rotatably fixes the first ball valve in a position perpendicular to the passage through the first annular body.

7. A fluid coupling according to claim 6 wherein the means for rotating the first ball valve includes fixed trunions.

8. A fluid coupling means according to claim 1 wherein the annular bodies have exteriors and the means for rotating the ball valves include handles disposed adjacent the exterior of the bodies wherein the annular bodies include a latch on each body that are capable of coupling the annular bodies together wherein either handle in the open position prevents the latches from uncoupling.

9. A fluid coupling means according to claim 8 wherein either handle in the open position is adjacent the latches in the coupled position.

10. A fluid coupling means according to claim 8 wherein either handle in the open position rests on top of the latches in the coupled position.

11. A fluid coupling means according to claim 8 wherein either handle in the open position prevents the lifting of either latch in the coupled position.

12. A fluid coupling means according to claim 8 wherein either handle in the open position prohibits the latches in the closed position from moving.

13. A fluid coupling means according to claim 8 wherein the first and second handle each include a handle button release that prevents the ball valves from rotating when the ball valves are in the fully open or fully closed position.

14. A fluid coupling means according to claim 13 wherein the handle button releases engage the housing when the ball valves are in the fully open or fully closed position.

* * * * *